(12) United States Patent
Yamakawa et al.

(10) Patent No.: US 10,721,361 B2
(45) Date of Patent: Jul. 21, 2020

(54) INTERPHONE SYSTEM AND SETTING APPARATUS

(71) Applicant: AIPHONE CO., LTD., Nagoya-shi, Aichi (JP)

(72) Inventors: Seiya Yamakawa, Nagoya (JP); Yuta Shimomura, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

(21) Appl. No.: 16/342,875

(22) PCT Filed: Oct. 28, 2016

(86) PCT No.: PCT/JP2016/082154
§ 371 (c)(1),
(2) Date: Apr. 17, 2019

(87) PCT Pub. No.: WO2018/078817
PCT Pub. Date: May 3, 2018

(65) Prior Publication Data
US 2019/0253562 A1 Aug. 15, 2019

(51) Int. Cl.
*H04M 9/02* (2006.01)
(52) U.S. Cl.
CPC ..................... *H04M 9/02* (2013.01)
(58) Field of Classification Search
CPC ........ H04M 9/02; H04M 11/025; H04M 9/06; H03M 1/12; E04H 1/04; H04Q 1/30
See application file for complete search history.

(56) References Cited

U.S. PATENT DOCUMENTS 8,489,469 B1 * 7/2013 Elberbaum ............ G06Q 30/00
705/26.81

FOREIGN PATENT DOCUMENTS

| CN | 104869478 A | 8/2015 |
| JP | S62-272739 A | 11/1987 |
| JP | H07-058870 A | 3/1995 |
| JP | 2004-260679 A | 9/2004 |

(Continued)

OTHER PUBLICATIONS

Extended European Search Report for related European Application No. 16920062.3, dated Jun. 12, 2019; 8 pages.

(Continued)

*Primary Examiner* — Duc C Ho
(74) *Attorney, Agent, or Firm* — Procopio, Cory, Hargreaves & Savitch LLP

(57) ABSTRACT

The present invention provides a distributed interphone system capable of simplifying registration of settings of individual devices, for example, when new ones are installed. An interphone system includes apartment parent devices having setting files containing control contents for control of the apartment parent devices, registered therein, terminal devices, and building control units. A setting apparatus includes accessing units for accessing at least one registered setting file and at least one unregistered setting file of the devices, a display unit for displaying the control contents of the plurality of accessed device setting files, and a control unit configured to be able to copy the control contents of the registered setting file displayed on the display unit into the unregistered setting file.

6 Claims, 13 Drawing Sheets

(56) References Cited

FOREIGN PATENT DOCUMENTS

| | | |
|---|---|---|
| JP | 2006-238201 A | 9/2006 |
| JP | 2007-013671 A | 1/2007 |

OTHER PUBLICATIONS

International Search Report and Written Opinion for related International Application No. PCT/JP2016/082154, dated Jan. 10, 2017; English translation of ISR provided; 8 pages.

* cited by examiner

Fig. 8

| | | Comparison-1 | | | | | | Copy | | | Comparison-2 | | | | |
|---|---|---|---|---|---|---|---|---|---|---|---|---|---|---|---|
| | Regist-ration | Comparison Item | | Quick List | Call Button | Unit Link-ID Setting | | To left | To right | Registration | Comparison Item | | Quick List | Call Button | Unit Link-ID Setting |
| | | Unit | Resident Name | | | | | | | | Unit | Resident Name | | | |
| Undo | 1 | 101 | LIAM | | 1 | A1 | | « | » | 1 | 101 | LIAM | | 1 | A1 |
| Undo | 2 | 102 | NOAH | | 2 | A2 | | « | » | 2 | 102 | NOAH | | 2 | A2 |
| Undo | 3 | 103 | MASON | | 3 | A3 | | « | » | 3 | 103 | MASON | | 3 | A3 |
| Undo | 4 | 201 | JACKSON | | 4 | B1 | | « | » | 4 | 201 | JACKSON | | 4 | B1 |
| Undo | 5 | 202 | LUCAS | | 5 | B2 | | « | » | 5 | 202 | LUCAS | | 5 | B2 |
| Undo | 6 | 203 | BENJAMIN | | 6 | B3 | | « | » | 6 | 203 | BENJAMIN | | 6 | B3 |

| Local Section ID | Comparison-1 | | | Copy | | Local Section ID | Comparison-2 | | |
|---|---|---|---|---|---|---|---|---|---|
| | Comparison Item | | | | | | Comparison Item | | |
| Section ID | Entrance ID | Entrance | Entrance Name | To left | To right | Section ID | Entrance ID | Entrance | Entrance Name |
| 1 | | | | « | » | | | | |
| 2 | | | | « | » | | | | |
| 3 | 2 | 3;0203 | LEFT | « | » | 1 | 2;0102 | CENTER |
| 4 | 2 | 5;0205 | BACK | « | » | 1 | 4;0104 | RIGHT |

Fig. 13

| | | Local Section ID | | | | | | Local Section ID | | | |
|---|---|---|---|---|---|---|---|---|---|---|---|
| | | Comparison Item | | Comparison-1 | | Copy | | Comparison Item | | Comparison-2 | |
| | | Section ID | Entrance ID | Entrance | Entrance Name | To left | To right | Section ID | Entrance ID | Entrance | Entrance Name |
| | 1 | | | | | | | 1 | | 0102 | CENTER |
| | 2 | | | | | ≪ | ≫ | 1 | | 0104 | RIGHT |
| Undo | 3 | | 2 | 0203 | LEFT | ≪ | ≫ | 2 | | 0203 | LEFT |
| Undo | 4 | | 2 | 0205 | BACK | ≪ | ≫ | 2 | | 0205 | BACK |

84AL — 84AC — 84AR — 84AaII (Copy all) — 25

Select comparison: 【Comparison-1】 ≪ ≫ 【Comparison-2】

- BUILDING CONTROL UNIT 40A
- BUILDING CONTROL UNIT 40B
- BUILDING CONTROL UNIT 40C
- ADMINISTRATIVE CENTER 5-1
- ADMINISTRATIVE CENTER 5-2

List of stations / List of setting

Save | Exit | Update (84Aup) | Select file

INTERPHONE SYSTEM AND SETTING APPARATUS

CROSS-REFERENCE TO RELATED APPLICATIONS

This application is a U.S. National Stage entry of PCT Application No: PCT/JP2016/082154 filed on Oct. 28, 2016, the contents of which are incorporated herein by reference.

TECHNICAL FIELD

The present invention relates to an interphone system and a setting apparatus for an apartment complex.

BACKGROUND ART

In the related art, as an interphone system for an apartment complex composed of a plurality of dwelling buildings and a central building, an interphone system disclosed in Patent Literature 1 is known.

In the interphone system for an apartment complex disclosed in Patent Document 1, a building controller of the central building connected to the individual dwelling buildings performs central control, i.e. control on signals which are transmitted from building entrance devices installed at the building entrances and so on of the individual dwelling buildings and are for calling individual apartment parent devices installed in the individual dwellings. According to this central control, in the case of newly building a dwelling building, with respect to settings of various devices of the building which is newly built, the existing setting contents in the controller of the central building may be changed, and it is unnecessary to perform setting change or new setting regeneration of the devices for the plurality of dwelling buildings, one by one.

CITATION LIST

Patent Document

Patent Document 1: Japanese Patent Application Laid-Open No. 2004-260679

DISCLOSURE OF THE INVENTION

Problems that the Invention is to Solve

By the way, there is a distributed interphone system in which the function of the building controller of the interphone system of Patent document 1 which is installed in the central building for managing calling signals is distributed to the building controllers, the building entrance devices, and so on of individual dwelling buildings. In this distributed interphone system, in each dwelling building, control on various devices such as the building controller, the building entrance devices, and so on is performed.

In this distributed interphone system, a dwelling building may be newly extended, or a new central building and new dwelling buildings may be built. In the case of building a new dwelling building or a new central building, it is required to newly register the control contents of various devices, such as building entrance devices, for the new dwelling building, or the control contents of various devices, such as a central building entrance device for the new central building. The new regeneration of the control contents of various devices is performed by newly registering the control contents in each device, or by manually inputting the control contents in each device while watching the settings of other devices already registered.

However, as devices for dwelling buildings, there is a plurality of types such as building controllers, building entrance devices, and so on, and in each dwelling building, there are several tens of devices which need setting. For this reason, it takes a huge amount of effort and time to newly register control contents in every device. In the case of building a central building and a new dwelling building in addition to building an extension to a dwelling building, the number of devices which need new regeneration increases according to building of new buildings, and new registration of control contents takes a huge amount of efforts, and requires a long time. In the case of registering the control contents of each device by manually inputting the control contents while watching the settings of other devices already registered, the efficiency improves as compared to the case of newly registering the control contents; however, the possibility of registering a wrong setting due to an inputting error attributable to manual inputting is high.

An object of the present invention is to provide an interphone system and a setting apparatus capable of making it possible to simplify registration of the settings of various devices for dwelling buildings and so on.

Means for Solving the Problems

An interphone system according to the present invention is an interphone system for an apartment complex composed of a plurality of dwelling buildings, and a central building capable of communicating with the dwelling buildings, wherein each of the dwelling buildings includes apartment parent devices which are installed in apartments, respectively, a plurality of terminal devices capable of communicating with the apartment parent devices, and a building controller which is connected to the apartment parent devices of the apartments and the plurality of terminal devices provided in the corresponding building, and each of the apartment parent devices, the terminal devices, and the building controllers has a setting file containing control contents for control of the corresponding device, and the interphone system further includes a setting apparatus capable of accessing the setting files of the apartment parent devices, the terminal devices, and the building controllers, and the setting apparatus includes an accessing unit configured to access at least registered one of the setting files and at least unregistered one of the setting files, a display unit configured to display the control contents of the plurality of accessed setting files, and a control unit configured to be able to copy the control contents of the registered setting file displayed on the display unit into the unregistered setting file.

According to the above-mentioned configuration, it is possible to provide an interphone system capable of copying the control contents of a setting file already registered in a device of a dwelling building, into the control contents of the setting file of an unregistered device.

Also, in the interphone system of the present invention, the central building may have a central-building terminal device capable of communicating with the apartment parent devices of the dwelling buildings, and a central control unit configured to connect the central building and the dwelling buildings such that communication is possible, and the central-building terminal device may have a setting file containing control contents for control of the central-building terminal device, registered therein in advance, and the accessing unit may be configured to be able to access the setting file of the central-building terminal device, and the control unit may be configured to be able to copy the control contents registered in the central-building terminal device in advance, into an unregistered setting file of the dwelling buildings.

According to the above-mentioned configuration, it is possible to register the control contents of the setting file of the central-building terminal device in an unregistered setting file of a device of a dwelling building by copying.

Also, in the interphone system of the present invention, the terminal devices of the dwelling buildings may include building entrance devices, and the building entrance devices may have setting files containing control contents for control of the building entrance devices, registered therein in advance, and the accessing unit may be configured to access the setting files of the terminal devices registered in advance.

According to the above-mentioned configuration, it is possible to register the contents of the setting file of a terminal device such as a building entrance device of a dwelling building containing the control contents already registered, into an unregistered setting file by copying.

Also, in the interphone system of the present invention, the terminal devices of the dwelling buildings may include apartment parent devices, and the apartment parent devices may have setting files containing control contents for control of the apartment parent devices, registered therein in advance, and the accessing unit may be configured to access the setting files of the apartment parent devices registered in advance.

According to the above-mentioned configuration, it is possible to register the contents of the setting file of a terminal device of a dwelling building, such as an administrative-room parent device, containing the control contents already registered, into an unregistered setting file by copying.

Also, in the interphone system of the present invention, the central-building terminal device may further have an unregistered setting file, and the control unit may be configured to be able to copy the control contents registered in the terminal devices of the dwelling buildings into the unregistered setting file of the central-building terminal device.

According to the above-mentioned configuration, it is possible to register the already-registered contents of the setting file of a device of a dwelling building, in an unregistered setting file of a central-building terminal device by copying.

Also, a setting apparatus of the present invention may include the accessing unit, the display unit, and the control unit.

According to the setting apparatus having the above-mentioned configuration, it is possible to simplify setting of a distributed interphone system.

Advantage of the Invention

According to the interphone system of the present invention, as compared to the case of performing manual inputting for each device, it is possible to efficiently register the contents of the setting files of devices, and it is possible to reduce errors attributable to manual inputting.

BRIEF DESCRIPTION OF DRAWINGS

FIG. 8 is a view for explaining device setting registration, and shows a screen example after copying of settings.

FIG. 9 is a view for explaining device setting registration, and shows a screen example before copying of settings.

FIG. 12 is a view for explaining device setting registration, and shows a screen example before copying of a second setting.

FIG. 13 is a view for explaining device setting registration, and shows a screen example after copying of the second setting.

BEST MODE FOR CARRYING OUT THE INVENTION

Hereinafter, an example of the present embodiment will be described with reference to the drawings.

An interphone system (intercom system) of the present embodiment is a system for an apartment complex, such as a mansion, which is composed of an administrative center (an example of a central building), and a plurality of dwelling buildings which is connected to the administrative center via a network on which communication can be performed according to a general-purpose protocol. Each building of a dwelling building A to a dwelling building E is configured to have building entrance devices (examples of terminal devices), an administrative-room parent device (an example of terminal devices), apartment parent devices, and a building control unit.

Figure 1:
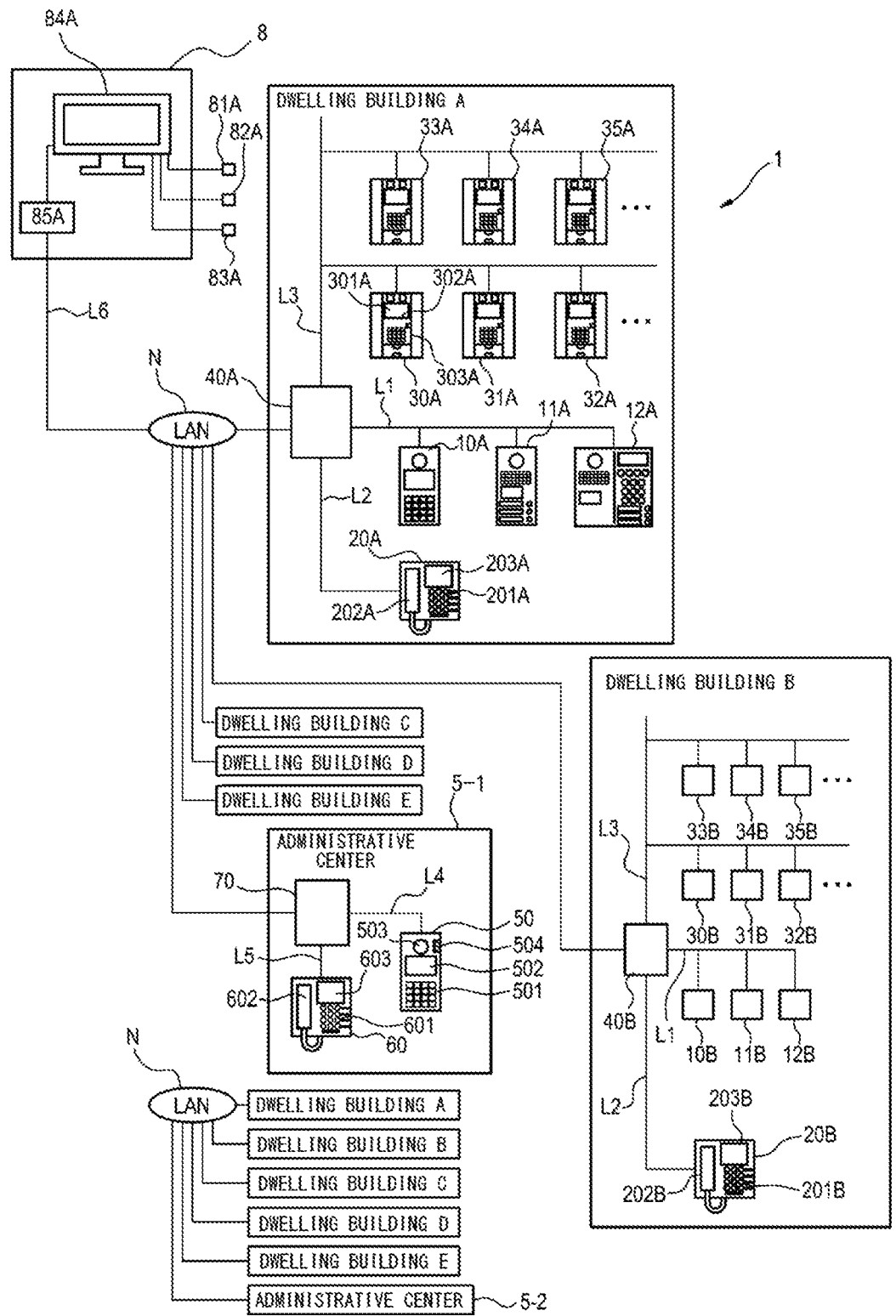
FIG. 1 is a view illustrating the configuration of an interphone system according to an embodiment of the present invention.

An interphone system 1 shown in FIG. 1 is configured in a dwelling building A to a dwelling building E which are connected to an administrative center 5-1 via a network N (in the present example, a LAN (Local Area Network)), and a dwelling building A to a dwelling building E which are connected to an administrative center 5-2 via a network N (a LAN (Local Area Network)).

The dwelling building A which is connected to the administrative center 5-1 has building entrance devices 10A 11A, and 12A, an administrative-room parent device 20A, apartment parent devices 30A, 31A, 32A, 33A, 34A, and 35A, and a building control unit 40A. Similarly to the dwelling building A, the dwelling building B which is connected to the administrative center 5-1 has building entrance devices 10B, 11B, and 12B, an administrative-room parent device 20B, apartment parent devices 30B, 31B, 32B, 33B, 34B, and 35B, and a building control unit 40B.

Similarly to the dwelling building A and the dwelling building B, the dwelling building C, the dwelling building D, and the dwelling building E have building entrance devices 10C, . . . , 10D, . . . , 10E, . . . , administrative-room parent devices 20C, 20D, and 20E, apartment parent devices 30C, . . . , 30D, . . . , 30E, . . . , and building control units 40C, 40D, and 40E.

Since the building entrance devices, the apartment parent devices, and the building control units which are individual devices of the dwelling building A to the dwelling building E have the same configurations, hereinafter, the individual devices which are provided in the dwelling building A connected to the administrative center 5-1 will be described, and a description of the individual devices of the dwelling building B to the dwelling building E connected to the administrative center 5-1 will not be made.

The building entrance devices 10A, 11A, and 12A of the dwelling building A are installed in building entrances, common spaces, and the like of the apartment complex. The building entrance devices 10A, 11A, and 12A are configured to be able to call, for example, the dwelling parent device 30A installed in the same building or the administrative-room parent device 20A installed in the same building. Also, the building entrance devices 10A, 11A, and 12A are configured to be able to take a video of, for example, a visitor.

As the building entrance devices, for example, there are devices using a system in which it is required to input an apartment number at a numeric keypad as shown in the building entrance device 10A, devices using a system in which it is required to push a dedicated button associated with a name as shown in the building entrance device 11A, devices using a system in which both of the numeric keypad system and the dedicated button system are possible as shown in the building entrance device 12A, and devices using a system in which it is required to push a dedicated button associated with an apartment number and a building number (not shown in the drawings).

The building entrance devices 10A, 11A, and 12A are connected to the building control unit 40A via an intercom line (a dedicated line) L1 so as to be able to communicate with the building control unit.

Since the building entrance devices 10A, 11A, and 12A have the same configuration, hereinafter, the building entrance device 10A will be described, and a description of the building entrance devices 11A and 12A will not be made.

The building entrance device 10A shown in FIG. 1 includes a calling unit 101, a storage unit 102, a camera 103, a building entrance display unit 104, a phone unit 105, a building entrance device CPU 106 (an example of a processing unit), and a building entrance device interface (hereinafter, the term "interface will be referred to as "I/F") 107 (an example of a transmitting unit).

A visitor or the like can operate the calling unit 101 in order to call the dwelling parent device 30A of the place to visit or the administrative-room parent device 20A of the administrative room. The calling unit 101 has input buttons (numeric keys, dedicated buttons, and so on) 111 for inputting the place to call, a call button 112 which is operated after the input buttons are operated, and so on.

In the storage unit 102, the setting file of the building entrance device 10A is stored in advance. The setting file of the building entrance device 10A contains the control contents of the building entrance device and the control contents of related devices.

As the control contents of the building entrance device, for example, the apartment numbers, resident's names, and apartment's names (for example, tenant's names) associated with the apartments in the corresponding building, i.e. the dwelling building A, item contents identifying the apartment parent devices 30A to 35A of the individual apartments, such as the dwelling parent device IDs (identification) (examples of dwelling parent device identification information), various call tables, and so on are stored. As examples of various call tables, there are a call table containing the apartment numbers of the individual apartments in the corresponding building and the dwelling parent device IDs of the individual apartments associated with each other, a call table containing the apartment numbers of the individual apartments in the corresponding building and either the names of the residents of the individual apartments or the names of the individual apartments and the dwelling parent device IDs associated with one another, and so on.

Also, in the setting file of the building entrance device 10A, as the control contents of the related devices, the control contents of the setting files of the devices of the corresponding building which the building entrance device 10A can call are stored. The related devices are, for example, the apartment parent devices 30A, . . . , and 35A and the administrative-room parent device 20A in the dwelling building A which are connected to the administrative center 5-1 shown in FIG. 1, and the control contents of the related devices are the control contents of the setting files which the apartment parent devices 30A, . . . , and 35A and the administrative-room parent device 20A retain as their control contents.

Figure 2:
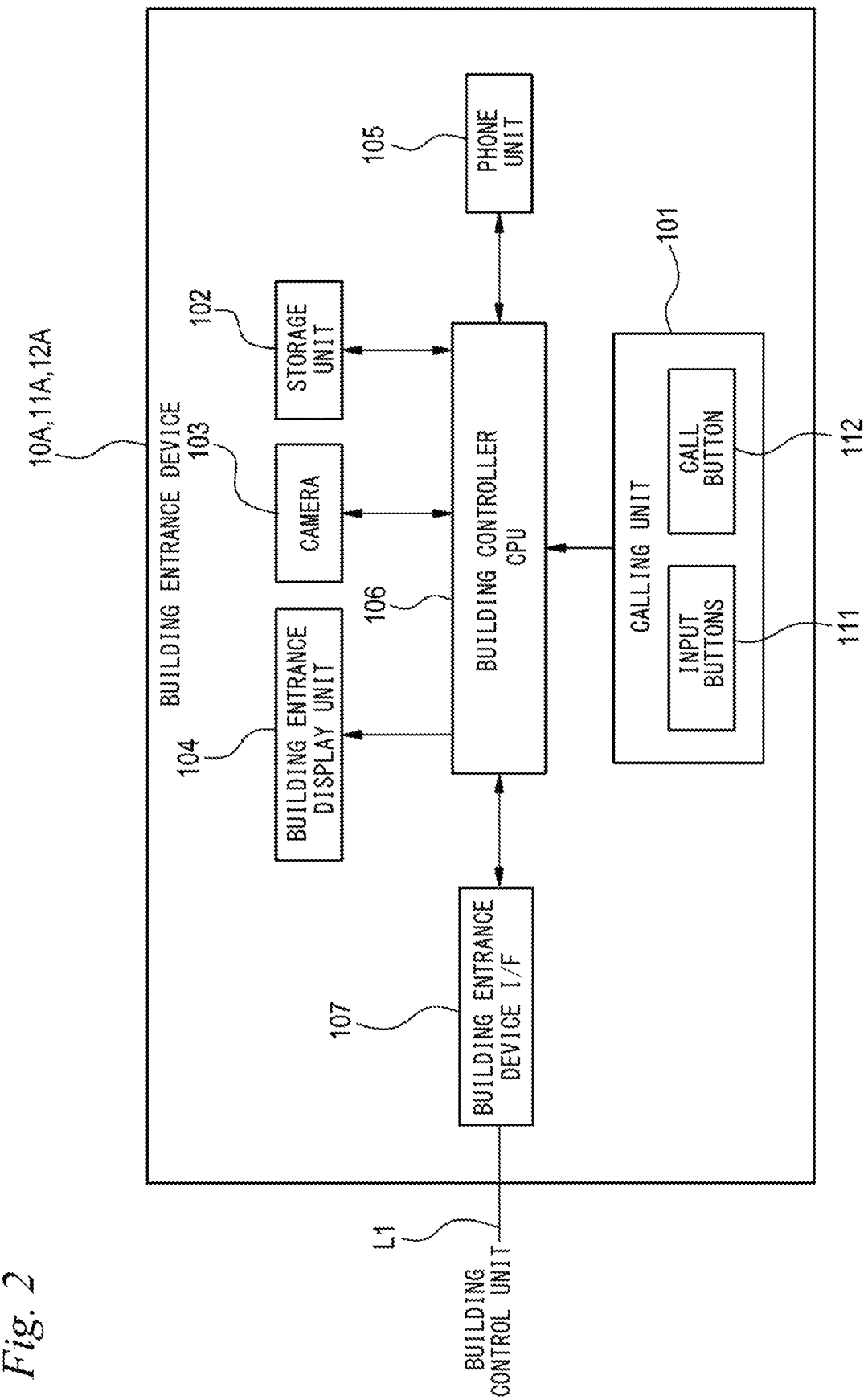
FIG. 2 is a functional block diagram of a building entrance device.

The camera 103 of the building entrance device 10A shown in FIG. 2 images a visitor or the like operating the building entrance device 10A. On the building entrance display unit 104, the apartment number which is input from the calling unit 101, a message for the visitor, a video of the visitor which the camera 103 is taking, and so on are displayed. The phone unit 105 is configured with a microphone and a speaker for conversing with a resident or a caretaker.

The building entrance device CPU 106 performs processing for controlling the operations of the individual units constituting the building entrance devices 10A, . . . , and 12A. For example, if an apartment number or a name is input, the building entrance device CPU 106 converts the input signal into the dwelling parent device ID of the called dwelling parent device 30A, on the basis of the call table. Also, for example, the building entrance device CPU 106 executes a driver (software) to operate the building entrance device 10A. Further, for example, in the case where a bug occurs or a freeze occurs in the display contents of the building entrance display unit 104, the building entrance device CPU 106 restarts the building entrance device 10A.

The building entrance device I/F 107 forms a bidirectional signal transmission channel between the building entrance device CPU 106 and the intercom line L1.

The administrative-room parent device 20A of the dwelling building A shown in FIG. 1 is installed in the administrative room of the apartment complex. The administrative-room parent device 20A is configured to be able to call, for example, the dwelling parent device 30A in the corresponding building. Also, the administrative-room parent device 20A includes an operation unit 201, a phone unit 202, a display unit 203, and so on, and is configured so as to enable a phone conversation with a visitor who is near the building entrance device 10A, 11A, or 12A or a resident who is near the dwelling parent device 30A. The administrative-room parent device 20A is connected to the building control unit 40A via an intercom line L2 so as to be able to communicate with the building control unit.

In the administrative-room parent devices 20A, a setting file containing the control contents of the administrative-room parent device 20A and the control contents of other related devices is stored in advance.

The control contents of the administrative-room parent device 20A are, for example, the administrative-room parent device ID (an example of an administrative-room parent device identification information item) identifying the administrative-room parent device 20A, the apartment numbers of the apartments in the corresponding building, setting item names such as the names of the residents of the apartments, the names of the apartments, and dwelling parent device IDs (dwelling parent device identification information items) identifying the apartment parent devices 30A, . . . , 35A, . . . of the apartments, call tables for various devices, and so on. The call tables are, for example, a call table containing the apartment numbers of the apartments in the corresponding building and the dwelling parent device IDs of the apartments associated with each other, a table containing the apartment numbers of the apartments in the corresponding building and either the names of the residents of the apartments or the names of the apartments and the dwelling parent device IDs of the apartments associated with one another, and so on.

Also, the setting file for the administrative-room parent device 20A contains the control contents of the other related devices. The related devices are, for example, the dwelling parent device 30A which is in the corresponding building (the dwelling building A connected to the administrative center 5-1) and which the administrative-room parent device 20A can call, the building entrance devices 10A, 11A, and 12A of the corresponding building capable of communicating with the administrative-room parent device 20A, and the building control unit 40A. The control contents of the other related devices are the control contents of the setting files which the building entrance devices 10A, 11A, and 12A of the dwelling building A connected to the administrative center 5-1, the apartment parent devices 30A, . . . , and 35A, and the building control unit 40A retain as their control contents.

The apartment parent devices 30A, 31A, 32A, 33A, 34A, 35A, . . . of FIG. 1 which are connected to the administrative center 5-1 are installed in the apartments in the apartment complex, respectively. The armament parent devices 30A, 31A, 32A, 33A, 34A, 35A, . . . have the same configuration. Therefore, hereinafter, the dwelling parent device 30A will be described, and a description of the apartment parent devices 31A, 32A, 33A, 34A, 35A, . . . will not be made.

The dwelling parent device 30A shown in FIG. 1 includes a display unit 301, an operation unit 302, a phone unit 303, and so on, and is configured to be able to respond to a call from, for example, the building entrance device 10A, 11A, or 12A, or the administrative-room parent device 20A.

The dwelling parent device 30A is connected to the building control unit 40A via an intercom line L3 so as to be able to communicate with the building control unit.

However, terminal devices having a function of calling any one of the apartment parent devices 30A to 35A may be placed in places which are used as shared spaces, for example, a party room, sub-entrances other than main entrances, besides the ones installed in the building entrances and the administrative room.

In the dwelling parent device 30A, a setting file containing the control contents of the corresponding dwelling parent device and the control contents of other related devices is stored in advance.

The control contents of the dwelling parent device are, for example, the dwelling parent device ID, the apartment numbers of the apartments in the corresponding building, setting item names such as the names of the residents or the names of the apartments, call tables for various devices, and so on. The call tables are, for example, a call table containing the apartment numbers of the apartments in the corresponding building and the dwelling parent device IDs of the apartments associated with each other, a call table containing the apartment numbers of the individual apartments in the corresponding building and either the names of the residents of the individual apartments or the names of the individual apartments and the dwelling parent device IDs associated with one another, and so on.

Also, the setting file for the dwelling parent device 30A contains the control contents of the setting files of devices to call the dwelling parent device 30A as the control contents of the other related devices.

The other related devices are, for example, the building entrance devices 10A, 11A, and 12A and the administrative-room parent device 20A which are in the corresponding building, i.e. the dwelling building A and can call the dwelling parent device 30A, and the control contents of the other related devices are the control contents of the setting files which the building entrance devices 10A, 11A, and 12A and the administrative-room parent device 20A retains as their control contents.

Figure 3:
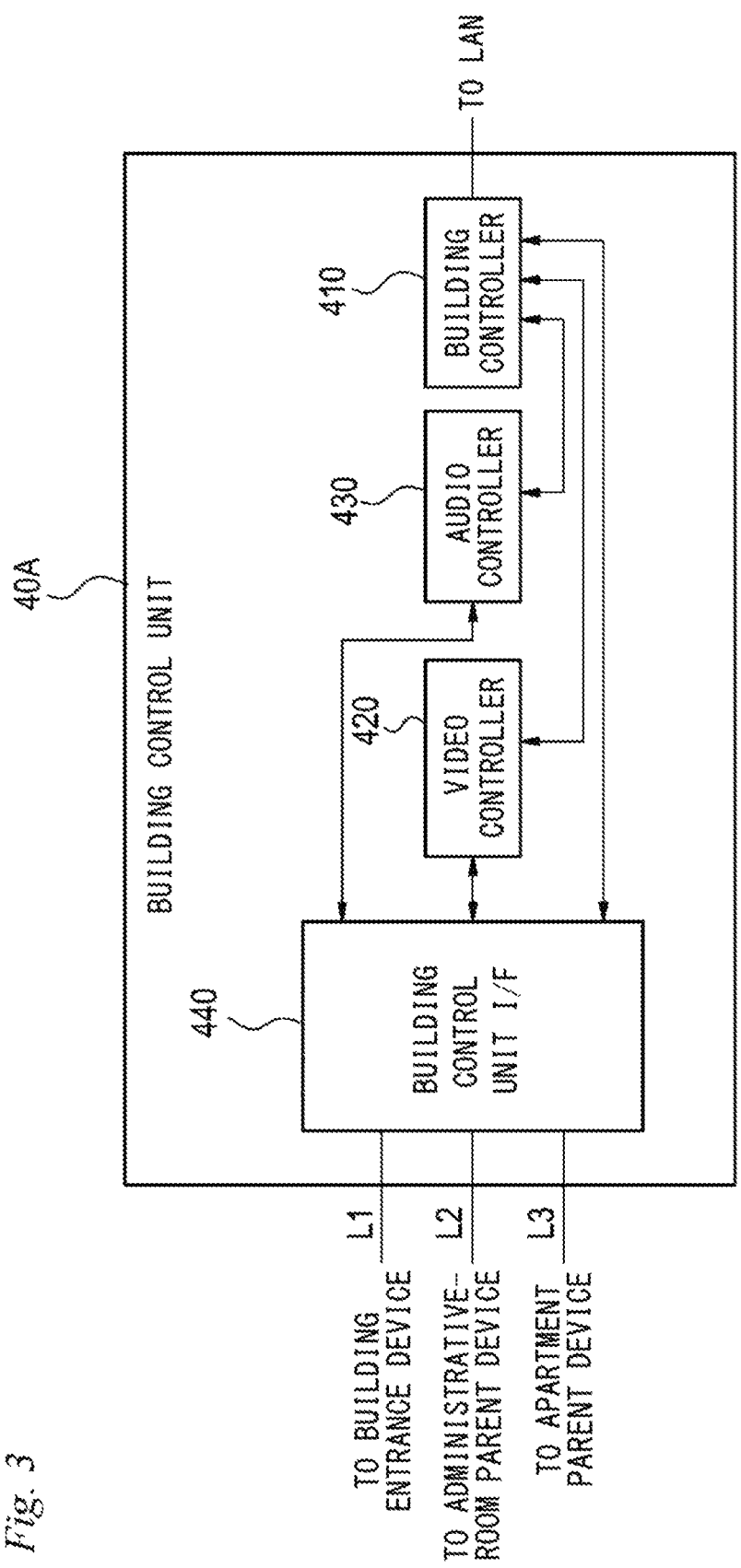
FIG. 3 is a functional block diagram of a building control unit.
Figure 4:
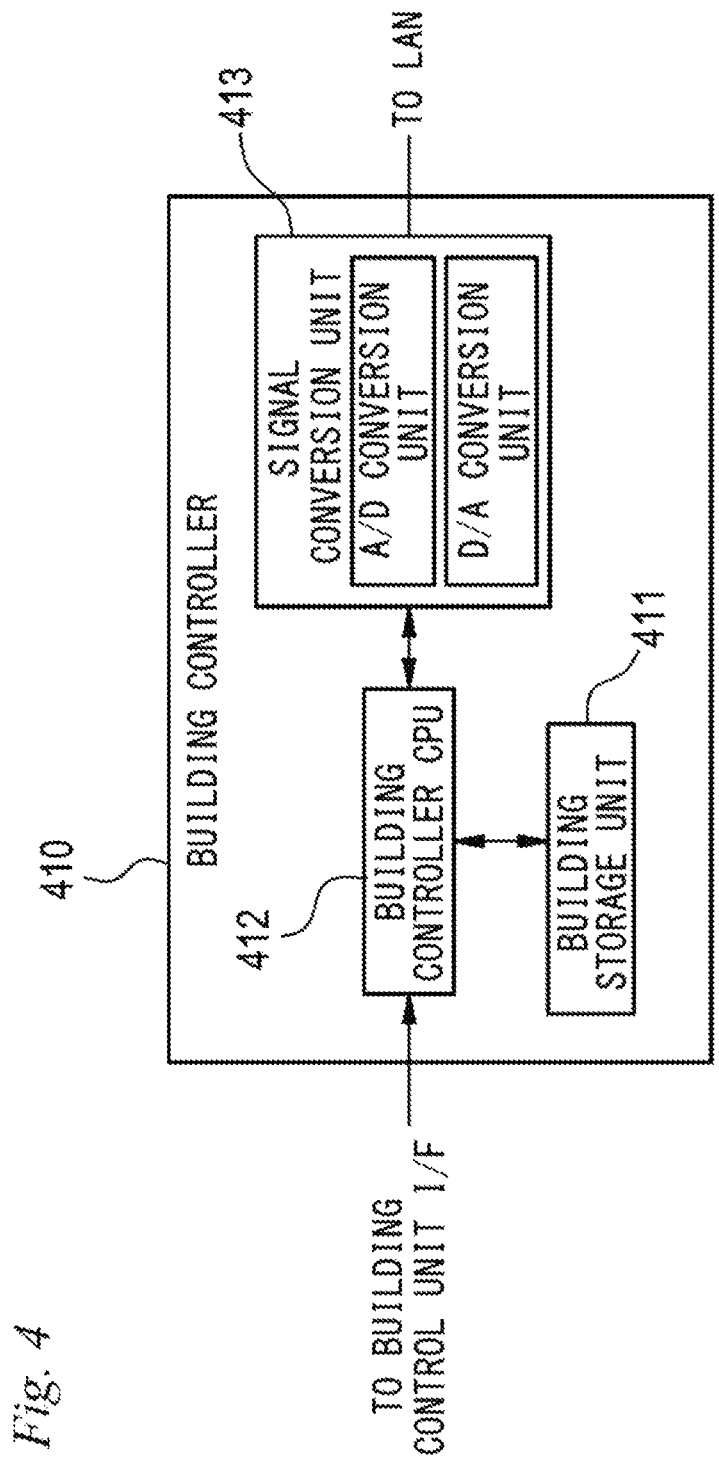
FIG. 4 is a functional block diagram of a building controller.

The building control unit 40A shown in FIG. 1, FIG. 3, and FIG. 4 controls communication with the building entrance devices 10A, 11A, and 12A, the administrative-room parent device 20A, and the apartment parent devices 30A, . . . installed in the corresponding building (the dwelling building A) via intercom lines, and so on. Also, the building control unit 40A is connected to the building control units 40B, . . . , and 40E of the other dwelling buildings (in the present example, the dwelling building B to the dwelling building E connected to the administrative center 5-1) and a central control unit 70 (to be described below) of the administrative center 5-1 via the network N so as to be able to communicate with them.

The building control unit 40A of the dwelling building A connected to the administrative center 5-1 and the building control units 40B, 40C, 40D, and 40E of the dwelling building B to the dwelling building E have the same configuration. Therefore, hereinafter, the building control unit 40A of the dwelling building A connected to the administrative center 5-1 will be described, and a description of the building control units 40B, 40C, 40D, and 40E of the dwelling building B to the dwelling building E will not be made.

The building control unit 40A shown in FIG. 1 includes a building controller 410, a video controller 420, an audio controller 430, a building control unit I/F 440 (an example of a building transmission unit), as shown in FIG. 3. Also, as shown in FIG. 4, the building controller 410 includes a building storage unit 411, a building controller CPU 412 (an example of a building processing unit), and a signal conversion unit 413.

In the building storage unit 411 of the building controller 410, the setting file of the building control unit 40A is stored in advance.

The setting file of the building control unit 40A contains the control contents of the corresponding building control unit and the control contents of other related devices.

The control contents of the building control unit are, for example, a setting item name such as the building controller ID of the building control unit 40A in the corresponding building, call tables for devices, and so on. The call tables are, for example, a call table containing the IDs of the individual devices of the building entrance devices 10A, 11A, and 12A, the administrative-room parent device 20A, and the dwelling parent device 30A which the building control unit 40A can communicate with, and the building control units 40B, . . . , and 40E of the dwelling building B to the dwelling building E and the central control unit 70 of the administrative center 5-1 which the building control unit 40A can communication with, associated with one another.

Also, the setting file of the building control unit 40A contains the control contents of other related devices. The other related devices are, for example, various devices such as the building entrance devices 10A, 11A, and 12A, the administrative-room parent device 20A, the dwelling parent device 30A installed at the building corresponding to the building control unit, i.e. the dwelling building A, and the central control unit 70 of the administrative center 5-1 for the corresponding building which can communicate with the building control unit. The control contents of the other related devices are, for example, the contents of the setting files which the building entrance devices 10A, 11A, and 12A, the administrative-room parent device 20A, and the dwelling parent device 30A installed in the corresponding building (the dwelling building A), and the central control unit 70 of the administrative center 5-1 for the corresponding building retain as their control contents.

The building controller CPU 412 performs processing for controlling the operations of the individual components of the building controller 410. For example, if a call signal indicating the apartment number or name associated with the dwelling parent device 30A is input from the administrative center 5-1, the building controller CPU 412 converts the input signal into the dwelling parent device ID of the called dwelling parent device.

The signal conversion unit 413 is a circuit for performing conversion from signals usable in the intercom lines L1 to L3 and signals usable in the network N. The signal conversion unit 413 includes an analog-to-digital conversion unit and a digital-to-analog conversion unit.

The analog-to-digital conversion unit (hereinafter, the term "analog-to-digital" will be referred to as "A/D") converts an analog signal which can be transmitted through the intercom lines L1 to L3 in each dwelling building into a digital signal which can be transmitted through the network N connecting the dwelling buildings to one another and connecting the dwelling buildings and the administrative center.

Meanwhile, the digital-to-analog conversion unit (hereinafter, the term "digital-to-analog" will be referred to as "D/A") converts a digital signal which can be transmitted through the network N connecting the dwelling buildings to one another and connecting the dwelling buildings and the administrative center into an analog signal which can be transmitted through the intercom lines L1 to L3 in each dwelling building.

The video controller 420 performs signal processing on a video signal taken by the camera 103 of the building entrance device 10A or a video signal input from the administrative center 5-1, and transmits the processed video signal to the dwelling parent device 30A or the administrative-room parent device 20A installed in the building in which the video controller is installed. The audio controller 430 performs audio processing on an audio signal input from the phone unit 105 of the building entrance device 10A, an audio signal input from the phone unit 202 of the administrative-room parent device 20A, or an audio signal input from the administrative center 5, and transmits the processed audio signal to the dwelling parent device 30A or the administrative-room parent device 20A installed in the building in which the video controller is installed.

The building control unit I/F 440 forms a bidirectional signal transmission channel between the building controller 410, the video controller 420, and the audio controller 430, and the intercom lines L1 to L3.

The administrative centers are configured to be able to manage the whole of the apartment complex composed of the dwelling building A to dwelling building E, and in FIG. 1, the administrative centers 5-1 and 5-2 are shown.

Each of the administrative centers 5-1 and 5-2 has central-building terminal devices and a central control unit. As examples of the central-building terminal devices, a central building entrance device 50 and a central administrative-room parent device 60 are shown in FIG. 1.

The administrative centers 5-1 and 5-2 have the same configuration. Therefore, hereinafter, the administrative center 5-1 will be described, and a description of the administrative center 5-2 will not be made.

The central building entrance device 50 of the administrative center 5-1 shown in FIG. 1 is installed at an entrance of the administrative center 5-1. The central building entrance device 50 includes a calling unit 501, a display unit 502, a camera 503, a phone unit 504, and so on. The central building entrance device 50 is configured to be able to call, for example, a specific dwelling parent device 30 of each dwelling building connected to the administrative center 5-1, or the central administrative-room parent device 60 of the administrative center 5-1. Also, the central building entrance device 50 is configured to be able to take a video of, for example, a visitor. The central building entrance device 50 is connected to the central control unit 70 via an intercom line L4 so as to be able to communicate with the central control unit.

The central building entrance device 50 retains a setting file containing the control contents of the central building entrance device, and the control contents of other related devices, registered therein.

The control contents of the central building entrance device 50 are the central building entrance device ID identifying the central building entrance device, item names such as the IDs of the individual devices of the dwelling building B to the dwelling building E connected via the network N, and a call table associated with the IDs of the individual devices, and so on.

The control contents of the other related devices are the control contents of setting files which the central administrative-room parent device 60 and the central control unit 70 installed in the administrative center 5-1 retain as their control contents, the control contents of setting files which the individual devices of the dwelling building A to the dwelling building E which are connected via intercom lines retain as their control contents, and so on.

The central administrative-room parent device 60 shown in FIG. 1 is installed in the administrative room of the administrative center 5-1. The central administrative-room parent device 60 includes an operation unit 601, a phone unit 602, a display unit 603, and so on. The central administrative-room parent device 60 is configured to be able to call, for example, the apartment parent devices 30 of the individual buildings. Also, the central administrative-room parent device 60 is configured so as to enable a phone conversation with a visitor who is near the central building entrance device 50, or a resident who is near an dwelling parent device 30. The central administrative-room parent device 60 is connected to the central control unit 70 via an intercom line L5 so as to be able to communicate with the central control unit.

In the central administrative-room parent device 60, a setting file containing the control contents of the central administrative-room parent device and the control contents of other related devices is stored in advance.

The control contents of the central administrative-room parent device 60 are the central administrative-room parent device ID of the central administrative-room parent device, the apartment numbers of the apartments in the dwelling building A to the dwelling building E, item names such as the names of the residents of the apartments, the names or dwelling parent device IDs of the apartments, or call tables for various devices, and so on. The call tables are, for example, a call table containing the apartment numbers of the apartments in the dwelling building A to the dwelling building E and the dwelling parent device IDs of the apartments associated with each other, a call table containing the apartment numbers of the apartments in the dwelling building A to the dwelling building E, either the names of the residents of the apartments or the names of the apartments, and the dwelling parent device IDs associated with one another, and so on.

The other related devices are, for example, the central building entrance device 50 and the central control unit 70 installed in the administrative center 5-1, and the individual devices installed in the dwelling building A to the dwelling building E. The control contents of the other related devices which are stored in the setting file of the central administrative-room parent device 60 are the control contents of setting files which the central building entrance device 50 and the central control unit 70 installed in the administrative center 5-1 and the individual devices installed in the dwelling building A to the dwelling building E retain as their control contents.

Figure 5:
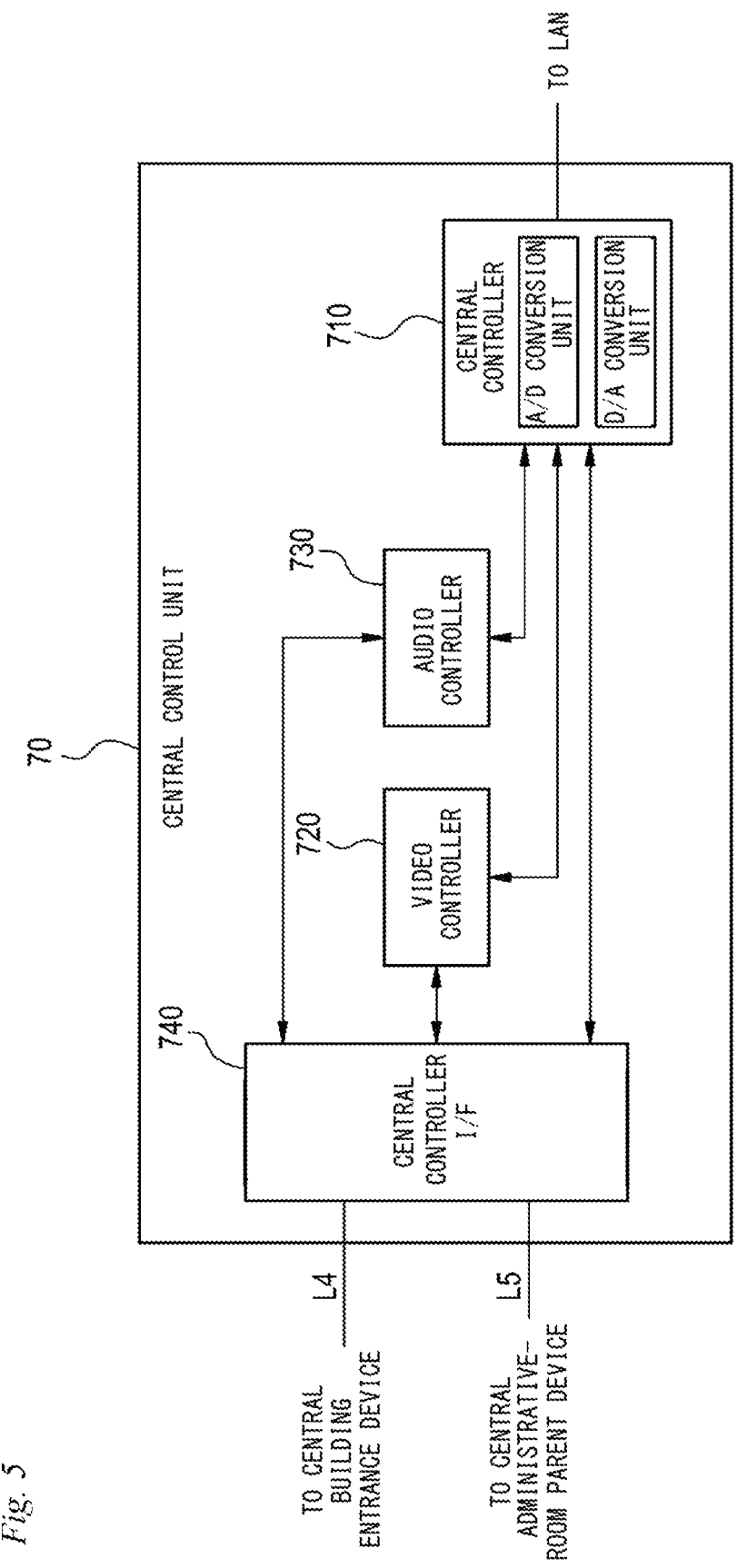
FIG. 5 is a functional block diagram of a central control unit.

The central control unit 70 shown in FIG. 1 and FIG. 5 controls communication with, for example, the central building entrance device 50 and the central administrative-room parent device 60 connected thereto via intercom lines. Also, the central control unit 70 is connected to the building control units 40A, . . . , and 40E of the dwelling building A to the dwelling building E associated with the administrative center 5-1, via the network N.

As shown in FIG. 5, the central control unit 70 includes a central controller 710, a video controller 720, an audio controller 730, and a central control unit I/F 740. Also, the central controller 710 includes an A/D conversion unit and a D/A conversion unit.

The A/D conversion unit of the central controller 710 converts an analog signal which can be transmitted through the intercom line L4 or L5 in the administrative center 5-1 into a digital signal which can be transmitted through the network N connecting the administrative center 5-1 and the individual dwelling buildings. Meanwhile, the D/A conversion unit converts a digital signal which can be transmitted through the network N connecting the administrative center 5-1 and the individual dwelling buildings into an audio signal which can be transmitted through the intercom line L4 or L5 in the administrative center 5-1.

The video controller 720 processes a video signal taken by the camera 503 of the central building entrance device 50, and transmits the processed video signal to the building controller 410 of each dwelling building. The audio controller 730 performs audio processing on an audio signal input from the phone unit 504 of the central building entrance device 50, or an audio signal input from the phone unit 602 of the central administrative-room parent device 60, and transmits the processed audio signal to the building controller 410 of each dwelling building.

The central control unit I/F 740 forms a bidirectional signal transmission channel between the central controller 710, the video controller 720, and the audio controller 730 and the intercom lines L4 and L5.

In the central controller 710, the setting file of the central control unit 70 is stored in advance.

The setting file of the central control unit 70 contains the control contents of the central control unit and the control contents of other related devices.

The setting file of the central control unit 70 contains an item name such as the central control unit ID of the central control unit 70, call tables for various devices, and so on, as the control contents of the central control unit.

Also, the setting file of the central control unit 70 contains the control contents of the other related devices.

The other related devices are, for example, the central building entrance device 50, the central administrative-room parent device 60, the building control units 40B to 40E of the dwelling building B to the dwelling building E connected to the administrative center 5-1, and so on which can communication with the central controller. The control contents of the other related devices are, for example, the control contents which the central building entrance device 50, the central administrative-room parent device 60, and the building control units 40B to 40E of the dwelling building B to the dwelling building E connected to the administrative center 5-1 retain as their control contents.

Configuration of Setting Apparatus

The interphone system of the present embodiment includes a setting apparatus capable of accessing the setting files of the individual devices such as the apartment parent devices, the terminal devices, and the building controllers.

Hereinafter, the setting apparatus will be described with reference to FIG. 1, and FIG. 6 to FIG. 13.

The setting apparatus includes accessing units for accessing the setting files of the various devices, a display unit, and a control unit. The display unit is configured to display the states of the setting files of the plurality of devices connected to the setting apparatus. Display of the states of the setting files includes display of the contents registered in setting files, and display of blanks indicating the unregistered state with respect to unregistered setting files.

The control unit configured to be able to copy the control contents of a registered setting file into an unregistered setting file with reference to the states of the setting files displayed on the display unit. The control unit can use an existing processing unit such as a CPU.

FIG. 1 shows, as an example of the setting apparatus, a setting apparatus 8 including accessing units 81A, 82A, and 83A capable of accessing the individual devices, a display device 84A for displaying setting files, and a control unit 85A capable of copying setting files.

The accessing units 81A, 82A, and 83A are configured to be able to access the setting files of the plurality of devices such as the terminal devices (the building entrance devices and the administrative-room parent devices) of the individual dwelling buildings, the apartment parent devices, the building controllers, the central-building terminal devices (central building entrance device and the central administrative-room parent device) of the administrative center which is the central building, and the central control unit. Access of the accessing units 81A, 82A, and 83A to the devices may be cable connection access using members such as cables and terminal members, or may be wireless access which is performed according to a general-purpose protocol.

Accessing units which are connected by cable can use various existing cords and cables having the shapes and specifications of terminals and cord specifications conforming to the accessing units.

FIG. 1 shows three accessing units 81A, 82A, and 83A. However, the number of accessing units is not limited to three, and an arbitrary number of accessing units required to register setting files can be provided. For example, in the case of reading out the setting file of one device, and disconnecting the setting apparatus 8 from the device while keeping the setting file temporally stored, and connecting an accessing unit to another device, and copying the contents of the temporarily stored setting file into the connected device, only one accessing unit may be provided. In the case of connecting the setting apparatus 8 to three devices at the same time, and reading out registered setting files from two of the connected devices, and copying the contents of the setting files into the other device, it is possible to use three accessing units 81A, 82A, and 83A as shown in FIG. 1.

A display unit 84A is configured to have a display screen for displaying the states of the setting files of various devices as shown in FIG. 1, and FIG. 6 to FIG. 13.

The display unit 84A is not particularly limited as long as it is a medium capable of displaying setting files, and for example, an existing display device such as a monitor screen which is mounted to a wall, a personal computer operable by external input means such as a mouse, and so on can be used.

The display unit 84A has fields for displaying the states of the setting files of various devices such as the building entrance device 10A connected by the accessing units 81A, 82A, and 83A, and so on. In the present embodiment, the display unit 84A includes a setting-file content display field 84AR shown on the right side of each of FIG. 6 to FIG. 13, and a setting-file content display field 84AL shown on the left side of each of FIG. 6 to FIG. 13.

In FIG. 6 to FIG. 13, the display unit 84A is composed of two fields, i.e. the setting-file content display fields 84AL and 84AR. However, the number of setting-file content display fields is not limited to two, and an arbitrary number of setting-file content display fields can be provided according to change in the number of devices which the setting apparatus can access, change in the number of setting registration items, and so on. For example, the field of the display unit 84A for displaying the states of setting files may be composed of three field, i.e. a first setting-file content display field which is displayed on the left side of the display unit 84A, a second setting-file content display field which is displayed at the center of the display unit 84A, and a third setting-file content display field which is displayed on the right side of the display unit 84A.

The fields for displaying states of setting files which are displayed on the display unit 84A include the registered contents of setting files (the registered item names and the registered control contents) and blanks indicating unregistered setting files, and so on.

Figure 6:
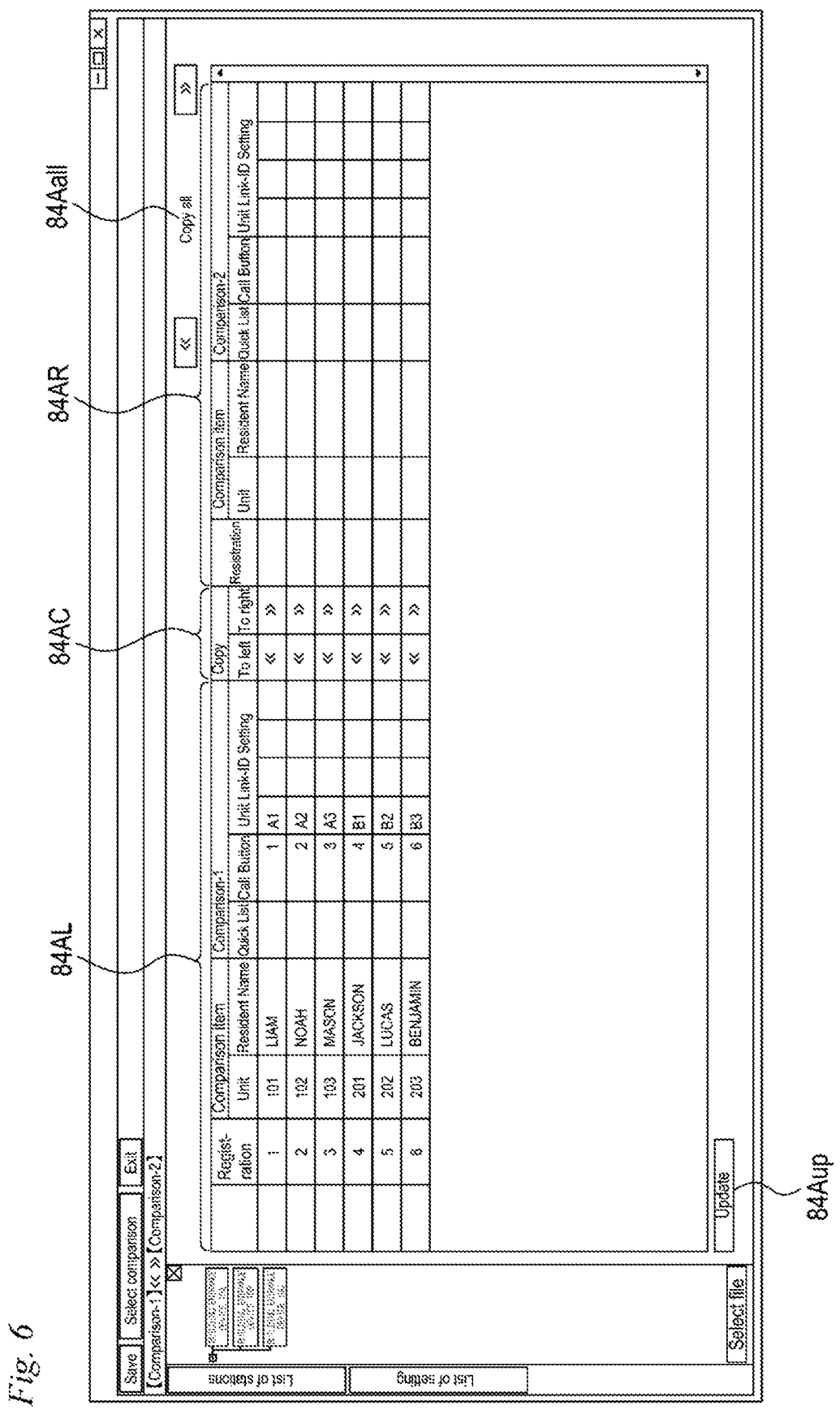
FIG. 6 is a view for explaining device setting registration, and shows a screen example before copying of settings.
Figure 9:
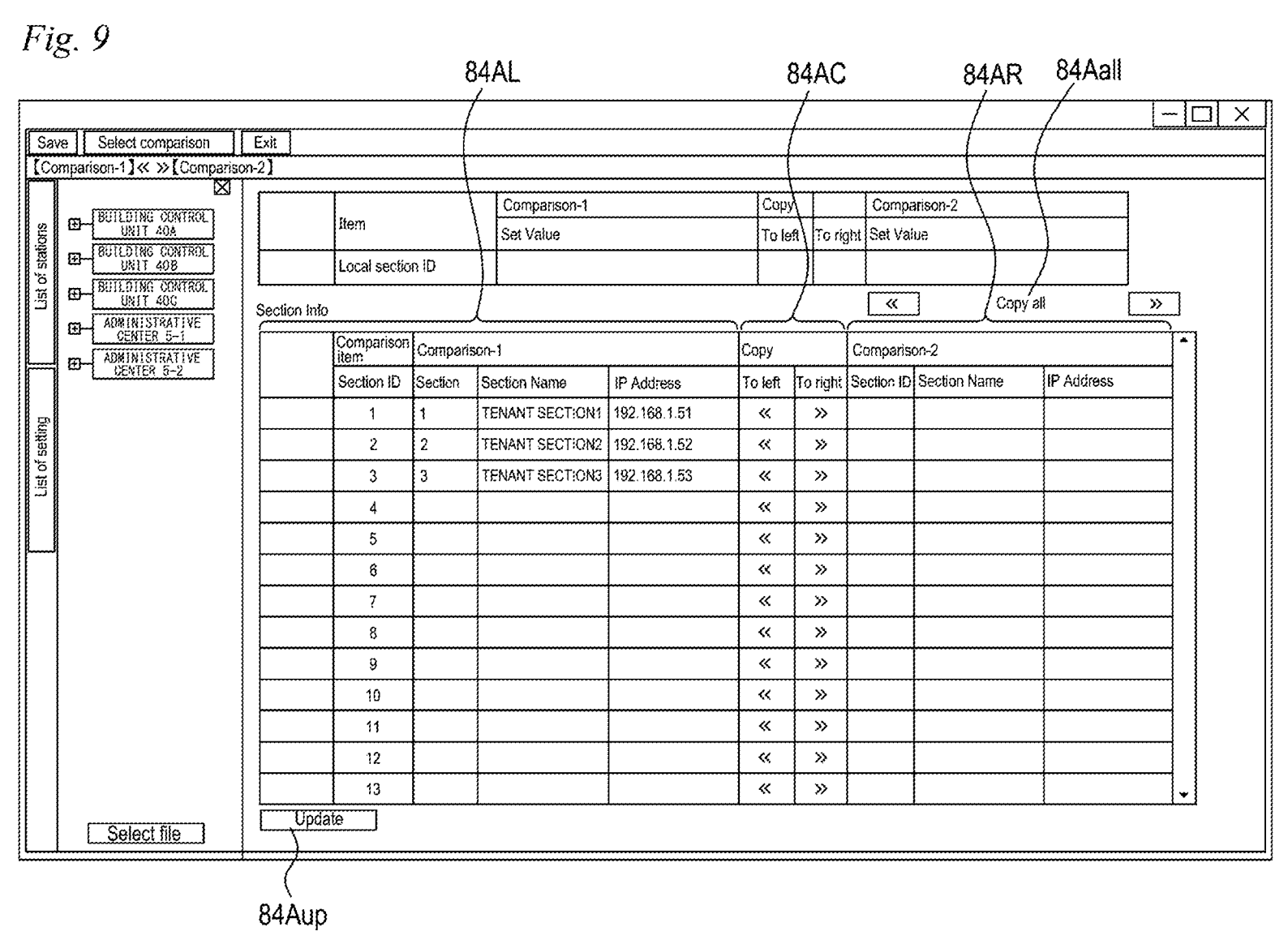

In the setting-file content display field 84AL shown in each of FIG. 6 to FIG. 13 and the setting-file content display field 84AR shown in each of FIG. 7, FIG. 8, and FIG. 10 to FIG. 13, the item names of registered setting files are displayed, and in the setting-file content display field 84AR shown in each of FIG. 6 and FIG. 9, blanks indicating unregistered setting files are displayed.

On the display unit 84A shown in each of FIG. 6 to FIG. 13, in the vicinity of the setting-file content display field 84AL, a "Save" field, a "Select comparison" field, and an "Exit" field are shown.

If an operation of selecting the "Save" field is performed by a click or the like, the contents displayed on the display unit 84A are saved in the control unit 85A.

If an operation of selecting the "Select comparison" field is performed by a click or the like, a device retaining a setting file to be displayed as a reference on the display unit 84A can be selected.

If an operation of selecting the "Exit" field is performed by a click or the like, the connection of the setting apparatus 8 with each of the device retaining the setting file displayed on the display unit 84A and selected as a reference and a device which is the destination of a copy of the setting file displayed on the display device 84A is released.

However, fields which can be displayed on the display unit 84A shown in FIG. 6 to FIG. 13 so as to be selectable are not limited to the fields shown in FIG. 6 to FIG. 13, and items which are used in general in a general-purpose computer or the like may be displayed on the display unit so as to be selectable.

In the display unit 84A shown in each of FIG. 6 to FIG. 13, in the vicinity of the center between the setting-file content display field 84AL and the setting-file content display field 84AR, a "Copy" instruction field 84AC is shown. In the "Copy" instruction field 84AC, a "To left" field and "<<" buttons which are operation buttons for copying the contents displayed in the setting-file content display field 84AR into the setting file displayed in the setting-file content display field 84AL are shown, and a "To right" field and ">>" buttons which are operation buttons for copying the contents displayed in the setting-file content display field 84AL into the setting file displayed in the setting-file content display field 84AR are shown.

Also, in the vicinity of the setting-file content display field 84AR on the display unit 84A shown in each of FIG. 6 to FIG. 13, a "Copy All" instruction field 84Aall is shown. In the "Copy All" instruction field 84Aall, a "<<" button and a ">>" button are shown. The "<<" button is an operation button for copying the contents displayed in the setting-file content display field 84AR into the setting file displayed in the setting-file content display field 84AL. The ">>" button is an operation buttons for copying the contents displayed in the setting-file content display field 84AL into the setting file displayed in the setting-file content display field 84AR.

Also, in the vicinity of the setting-file content display field 84AL shown in each of FIG. 6 to FIG. 13, as an data update instruction field 84Aup, an "Update" button is shown. The data update instruction field 84Aup is configured to execute the previous operation contents in the setting-file content display field 84AR or the setting-file content display field 84AL if being selected by a click or the like.

Figure 7:
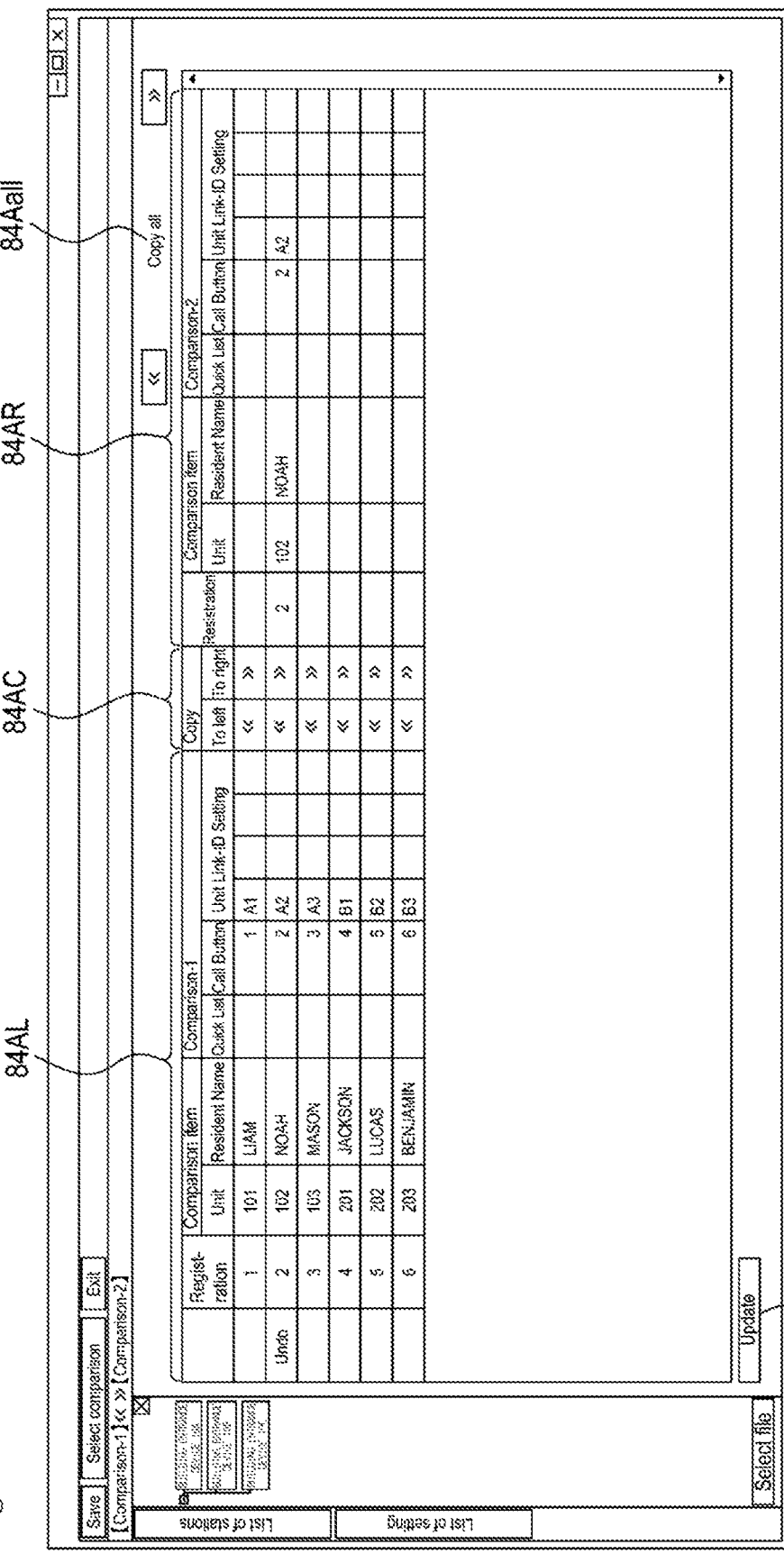
FIG. 7 is a view for explaining device setting registration, and shows a screen example after copying of settings.

Also, in the setting-file content display field 84AL of FIG. 7, only in the field associated with No. 2 of an item "Registration", an "Undo" (Turn Back) item is displayed. If an operation of selecting the "Undo" button is performed by a click or the like, the previous operation is canceled, and the display state of the display unit 84A returns to the previous state.

The contents of setting files which are displayed on the display unit 84A depend on the contents of the setting files of individual devices, and as an example, a call table which the building entrance device 10A retains, and the individual items shown in FIG. 6 to FIG. 13 are displayed.

In the setting-file content display field 84AL on the display unit 84A of FIG. 6, the registered item names of the building entrance device 10A registered in the building entrance device 10A are shown, and sequentially from the left of the setting-file content display field 84AL, items "Registration", "Unit", "Resident Name", "Quick List", "Call Button", and "Unit Link-ID setting" are shown.

The item "Registration" indicates the number of settings registered in the building entrance device 10A, and in FIG. 6, as many numbers as apartments connected to the building entrance device 10A, i.e. 1 to 6 are shown.

The item "Unit" contains the apartment numbers of apartments connected to the building entrance device 10A, registered therein, and in FIG. 6, the apartment numbers of six apartments, i.e. Apartment No. 101 to Apartment No. 103 and Apartment No. 201 to Apartment No. 203 are shown.

The item "Resident Name" indicates resident names, and in FIG. 6, "LIAM", "NOAH", . . . , and "BENJAMIN" are shown as resident names.

The item "Call Button" indicates buttons provided in the building entrance device 10A, and the numbers 1 to 6 in the item "Call Button" shown in FIG. 6 indicate that the number of apartment parent devices 30A, one of which is installed in each apartment, is six.

The item "Unit Link-ID Setting" of FIG. 6 indicates the communication IDs of the apartment parent devices 30A. "A1" in the item "Unit Link-ID Setting" of FIG. 6 indicates that the communication ID of the dwelling parent device 30A of Apartment No. 101 is "A1", and "B3" in the item "Unit Link-ID Setting" shown in FIG. 6 indicates that the communication ID of the dwelling parent device 30A of Apartment No. 203 is "B3".

In the setting-file content display field 84AL on the display unit 84A of FIG. 9, the control contents of the central control unit 70 of the administrative center 5-1 retained in the central control unit, and the control contents of related devices are shown. Sequentially from the left of the setting-file content display field 84AL, items "Section", "Section Name", and "IP Address" are shown.

In the item "Section" of FIG. 9, as many items as the building controller IDs of the building control unit 40A of the dwelling building A, the building control unit 40B of the dwelling building B, and the building control unit 40C of the dwelling building C retained in the central control unit 70 of the administrative center 5-1, items 1 to 3 are shown.

In the item "Section Name" of FIG. 9, as the building control unit ID of the building control unit 40A of the dwelling building A, the building control unit ID of the building control unit 40B of the dwelling building B, and the building control unit ID of the building control unit 40C of the dwelling building C, "TENANT SECTION 1", "TENANT SECTION 2", and "TENANT SECTION 3" are shown, respectively.

The item "IP Address" indicates the IP addresses of the building control units for communication. In the item "IP Address", "192.168.1.51" is shown as the IP address of the building control unit 40A of the dwelling building A, "192.168.1.52" is shown as the IP address of the building control unit 40B of the dwelling building B, and "192.168.1.53" is shown as the IP address of the building control unit 40C of the dwelling building C, respectively.

Figure 11:
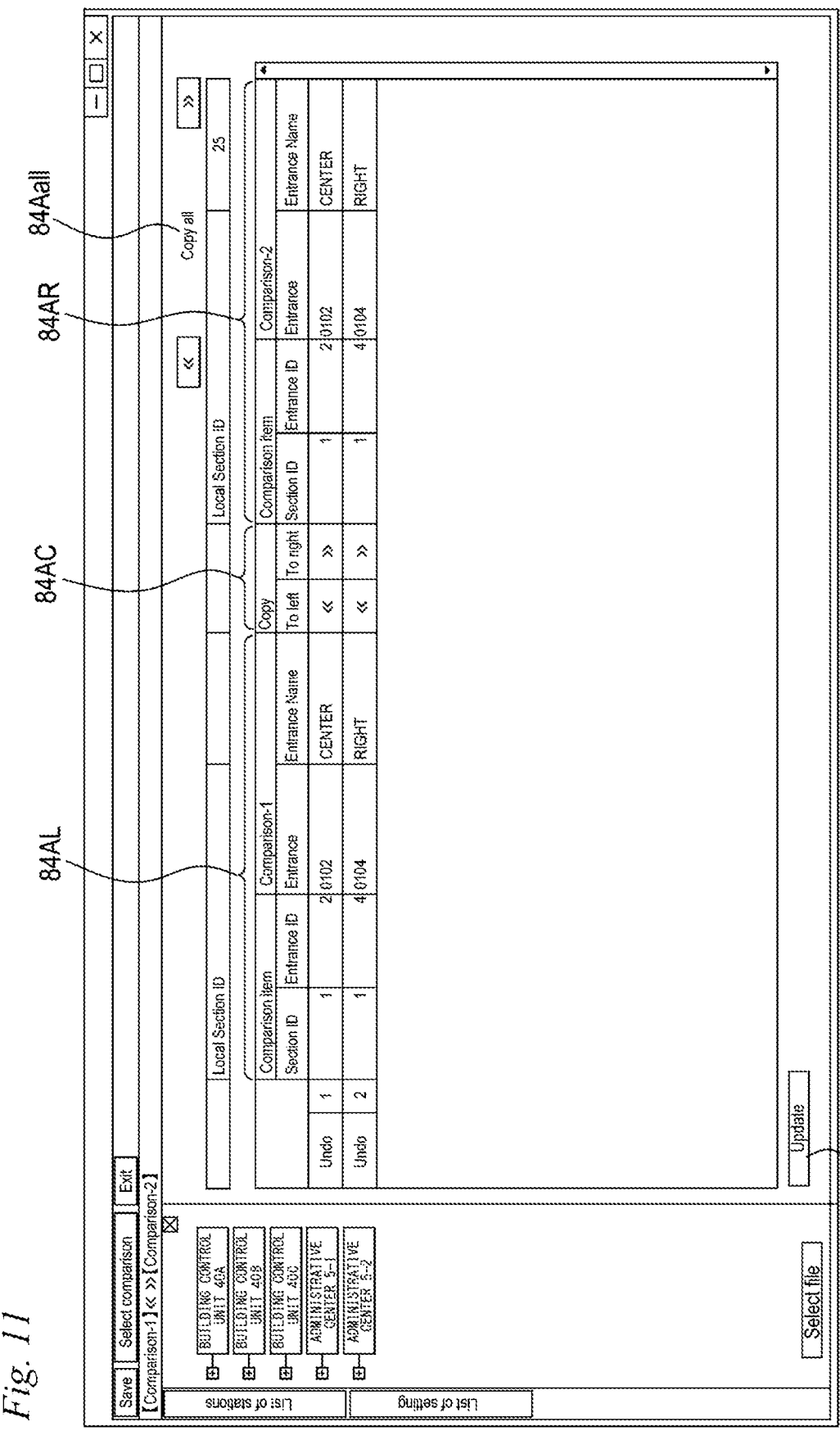
FIG. 11 is a view for explaining device setting registration, and shows a screen example after copying of a first setting.

In the setting-file content display field 84AL on the display unit 84A of each of FIG. 11 to FIG. 13, the contents of the setting file of the building entrance device 10A of the dwelling building A retained in the building control unit 40A of the dwelling building A, and the contents of the setting file of the building entrance device 10B of the dwelling building B retained in the building control unit 40B of the dwelling building B are shown.

An item "Section ID" of FIG. 11 indicates numbers depending on devices from which the contents have been read into the display unit 84A. A number "1" shown in the item "Section ID" of FIG. 11 indicates that the setting file content in the setting-file content display field 84AL has been read from the building control unit 40A of the dwelling building A. A number "2" shown in the item "Section ID" of each of FIG. 12 and FIG. 13 indicates that the setting file contents in the setting-file content display field 84AL has been read from the building control unit 40B of the dwelling building B.

In FIG. 11, items "Entrance ID" and "Entrance" show the building entrance device IDs of the building entrance devices 10A and 11A of the dwelling building A from which the contents have been read into the display unit 84A. An item "Entrance Name" indicates the location information of the building entrance devices 10A and 11A of the dwelling building A. The value "2" of the item "Entrance ID", the value "0102" of the item "Entrance", and the value "CENTER" of the item "Entrance Name" shown in association with Item No. 1 in the setting-file content display field 84AL indicate that the building entrance device 10A of the dwelling building A is at the central entrance of the dwelling building A, and the building entrance device IDs are "2" and "0102".

Operation of Setting Apparatus

Hereinafter, an example of an operation of registering the settings of various devices by the setting apparatus will be described with reference to FIG. 1, and FIG. 6 to FIG. 13. In the present embodiment, as the display unit 84A shown in FIG. 6 to FIG. 13, a personal computer having a mouse as an external input means is used.

First Operation Example

As a first operation example, the case of separately copying the registered contents of a setting file into an unregistered setting file will be described.

As an example, the case of performing registration of the setting file of a new building entrance device which is installed in a building, with reference to the setting registration contents of the registered setting file of a building entrance device of the same building.

Here, as the setting contents of the building entrance device, the same contents as the registered setting contents of another building entrance device may be registered, or different setting contents may be registered depending the positions of individual building entrance devices.

With respect to the setting contents of the building entrance device 11A shown in FIG. 6 and FIG. 7, if checking whether to register setting contents different from those of the building entrance device 10A shown in FIG. 6 and FIG. 7 or not, it can be seen that it has been determined not to use the setting contents of the building entrance device 10A shown in association with Apartment No. 101 in FIG. 6, in the building entrance device 11A, and it has been determined to register the same contents as the setting contents of the building entrance device 10A shown in association with Apartment No. 102 in FIG. 6, in the setting contents of the building entrance device 11A. Hereinafter, setting using copying of the setting contents of the building entrance device 10A associated with Apartment No. 102 will be described.

In FIG. 6, in the setting-file content display field 84AL on the display unit 84A, the items stored in the setting file of the building entrance device 10A of the dwelling building A are shown. In the setting-file content display field 84AR of FIG. 6, a setting file field for the building entrance device 11A which is newly installed is shown as being blank. This indicates that the setting file of the building entrance device 11A is unregistered.

In order to register the data of the building entrance device 10A associated with Apartment No. 102 into the setting file of the building entrance device 11A, an operation of selecting a ">>" button displayed in the "To right" field of the "Copy" instruction field 84AC and positioned on the right side in the row associated with the value "2" of the item "Registration" (Apartment No. 102) shown in FIG. 6 by clicking the mouse or the like is performed. If the selecting operation is performed, as shown in the setting-file content display field 84AR of FIG. 7, as the setting contents of the building entrance device 11A in the field associated with No. 2 of the item "Registration", the setting contents of the building entrance device 10A associated with No. 2 of the item "Registration" are copied and pasted.

After whether the pasted contents are correct is confirmed, the data update instruction field 84Aup of FIG. 7 is selected by clicking the mouse or the like. By this selecting operation, the data of the building entrance device 10A shown in association with Apartment No. 102 in the setting-file content display field 84AR on the display unit 84A is registered, as data of the building entrance device 11A associated with Apartment No. 102, in the setting file of the building entrance device 11A.

In order to save the contents registered in the setting file of the building entrance device 11A, the "Save" field on the display unit 84A is selected by a click or the like. By this selecting operation, the data of the building entrance device 10A shown in association with Apartment No. 102 the setting-file content display field 84AR on the display unit 84A is saved, as data of the building entrance device 11A associated with Apartment No. 102, in the control unit for storing the setting file of the building entrance device 11A.

Although it is required in the related art to manually register the items "Unit", "Resident Name", "Call Button", and "Unit Link-ID Setting", as described above, registration of them can be completed by one operation of selecting a ">>" button displayed in the "To Right" field of the "Copy" instruction field 84AC. Therefore, it is possible to prevent setting content input errors attributable to manual inputting, and it is possible to register the contents of a registered setting file in the contents of an unregistered setting file, without damaging the contents of the registered setting file, and the efficiency of registration of the settings of various devices such as the building entrance device 11A dramatically improves.

Second Operation Example

As a second operation example, the case of copying all of the registered contents of a setting file into an unregistered setting file will be described.

As an example, the case of copying all of the contents of a setting file registered in a building entrance device of a building into an unregistered setting file of another building entrance device of the building with reference to the setting file registered in the building entrance device will be described. FIG. 6 and FIG. 8 are explanatory views illustrating an operation of copying all of the contents of a setting file registered in the building entrance device 10A of the dwelling building A into an unregistered setting file of the building entrance device 11A of the same building.

In the setting-file content display field 84AL of FIG. 6, the setting contents registered in the building entrance device 10A are shown. In the setting-file content display field 84AR of FIG. 6, information of the building entrance device 11A having an unregistered setting file is shown.

If the ">>" button in the "Copy All" instruction field 84Aall on the display unit 84A of FIG. 6 is selected by a click or the like, all items of the registered contents of the setting file of the building entrance device 10A displayed in the setting-file content display field 84AL of FIG. 6 are copied and pasted in the unregistered sections of the building entrance device 11A displayed in the setting-file content display field 84AR of FIG. 6. FIG. 8 shows the state where the copying operation has been completed.

Registration of the data pasted in the setting-file content display field 84AR by the data update instruction field 84Aup and saving of the corresponding data by the "Save" field are the same as described with reference to FIG. 6, so a description thereof will not be made.

Although it is required in the related art to manually register the items "Unit", "Resident Name", "Call Button", and "Unit Link-ID Setting", and perform such registration with respect to all of setting items of devices which needs setting, as described above, it is possible to complete registration of them by one operation of selecting a ">>" button displayed in the "To Right" field of the "Copy All" instruction field 84Aall, and it is possible to prevent input errors attributable to repetition of manual inputting. Since it is possible to copy a plurality of items by selecting the "Copy All" instruction field 84Aall by one click or the like, the efficiency of registration of settings in the building entrance device 11A further improves.

Third Operation Example

Figure 10:
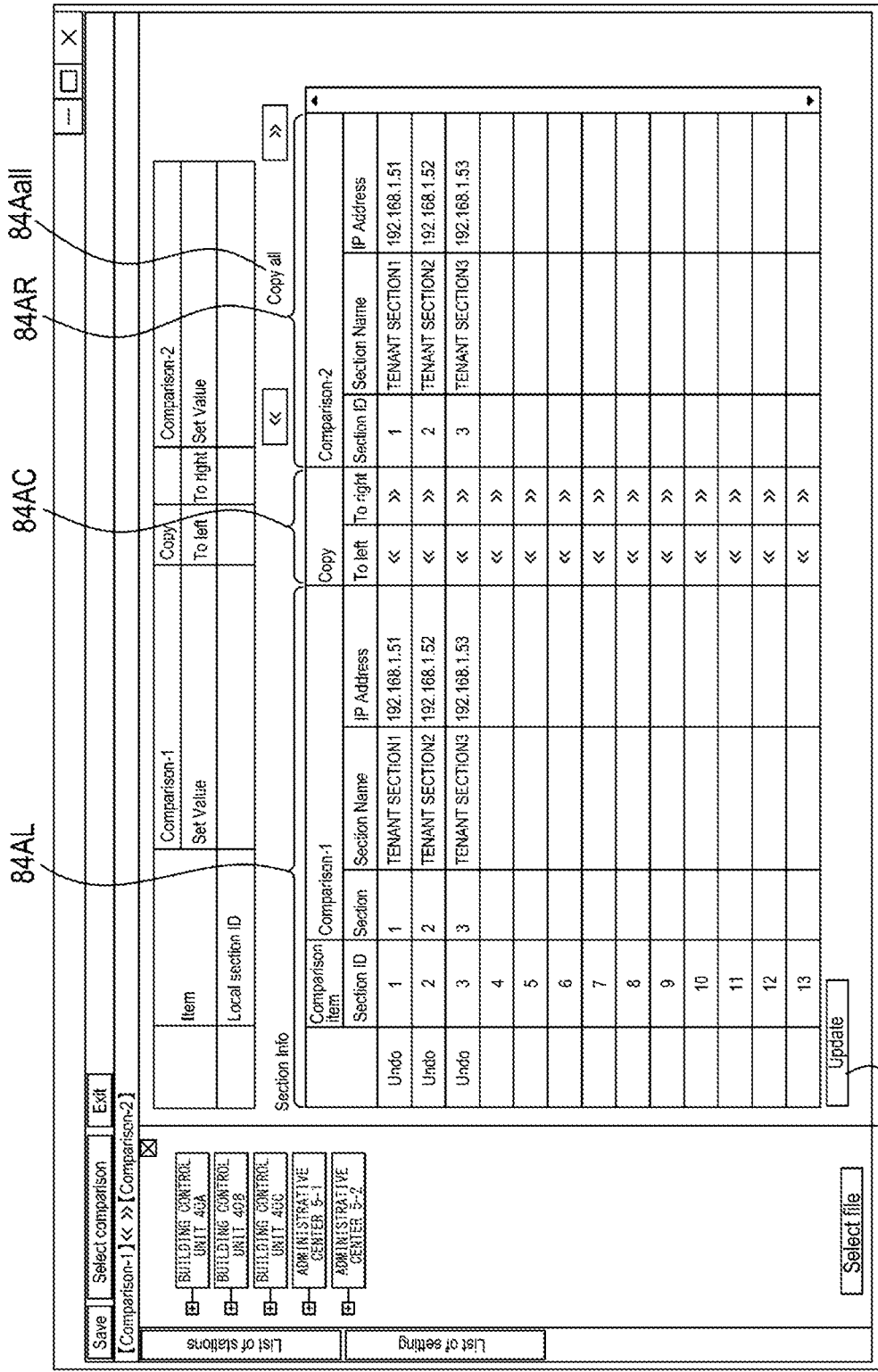
FIG. 10 is a view for explaining device setting registration, and shows a screen example after copying of settings.

Now, distribution of data, i.e. the case of registering the contents of a registered setting file in the setting files of a plurality of devices by copying will be described. FIG. 9 and FIG. 10 are explanatory views of an operation of registering the setting files of the building control units 40 connected to the administrative center 5-2 by copying while referring to a setting file registered in the central control unit 70 of the administrative center 5-1.

In the setting-file content display field 84AL of FIG. 9, as the contents of setting file registered in the central control unit 70 of the administrative center 5-1, items registered in the setting files of the building control units 40A, 40B, and 40C connected to the administrative center 5-1 are shown.

In the setting-file content display field 84AR of FIG. 9, as the contents of the setting file of the building control unit 70 of the administrative center 5-2, the setting files of the building control units 40 connected to the administrative center 5-2 are shown as being blank. This indicates that the setting files of the building control units 40 connected to the administrative center 5-2 are unregistered.

In order to register the setting files of the building control units 40 connected to the administrative center 5-2 by copying while referring to the setting file registered in the central control unit 70 of the administrative center 5-1, the ">>" button displayed in the "Copy All" instruction field 84Aall on the display unit 84A of FIG. 9 is selected by a click or the like. By this selecting operation, as shown in the setting-file content display field 84AR of FIG. 10, the "Section ID" fields, the "Section Name" fields, and the "IP Address" fields associated with the building control units 40 which are the contents registered in the setting file of the central control unit 70 of the administrative center 5-1 are copied and pasted in the "Section ID" fields, the "Section Name" fields, and the "IP Address" fields displayed in association with the building control units 40 in the setting-file content display field 84AR associated with the central control unit 70 of the administrative center 5-2.

Registration of the pasted data by the data update instruction field 84Aup and saving of the corresponding data by the "Save" field is the same as described with reference to FIG. 6, so a description thereof will not be made.

As described above, since it is possible to register the contents registered in the setting file of a central control unit in the contents of a plurality of unregistered devices such as building control units by copying, it is possible to efficiently register the control contents of building control units which are connected to an administrative center which is newly built, and the efficiency of registration of the control contents of an administrative center and dwelling buildings which are newly built further improves.

Fourth Operation Example

Now, collecting and merging of data, i.e. the case of registering one setting file with reference to the contents of a plurality of registered setting files by copying will be described.

As an example, an operation of sequentially registering a plurality of settings by copying a first setting in setting items of the setting file of the central controller 710 of the central control unit 70 of the administrative center 5-2 with reference to the setting file of the building controller 410A of the building control unit 40A of the dwelling building A connected to the administrative center 5-1, and registering the corresponding setting, and copying a second setting in setting items of the setting file of the central controller 710 of the central control unit 70 of the administrative center 5-2 with reference to the setting file of the building controller 410A of the building control unit 40B of the dwelling building B connected to the administrative center 5-1, and registering the corresponding setting will be described with reference to FIG. 1, and FIG. 11 to FIG. 13.

In the setting-file content display field 84AL of FIG. 11, the building control unit 40A of the dwelling building A connected to the administrative center 5-1, the building control unit 40B of the dwelling building B connected to the administrative center 5-1, and the building control unit 40C of the dwelling building C connected to the administrative center 5-1 are shown. In the setting-file content display field 84AR of FIG. 11, the central control unit 70 of the administrative center 5-2 is shown.

The devices from which the settings shown as references in the setting-file content display field 84AL of FIG. 11 have been read are the building control unit 40A of the dwelling building A and the building control unit 40B of the dwelling building B connected to the administrative center 5-1, and the destination of the copies of the settings is the central control unit 70 of the administrative center 5-2 shown in the setting-file content display field 84AR of FIG. 11.

In FIG. 11, as the setting contents of the building control unit 40A which is the reference source for setting, "CENTER" is shown as an item "Entrance Name" in the first row, and "RIGHT" is shown as an item "Entrance Name" in the second row.

If the ">>" button shown in the "Copy All" instruction field 84Aall of FIG. 11 is selected by a click or the like, the operation of copying the contents registered in the setting-file content display field 84AL and pasting the copy in the setting-file content display field 84AR is completed, and the first setting is registered. The setting contents of the building control unit 40A which is the reference source is pasted in the setting content field of the setting-file content display field 84AR of FIG. 11 associated with the central control unit 70 of the administrative center 5-2.

In FIG. 12, as the reference source, the building control unit 40B of the dwelling building B connected to the administrative center 5-1 are shown. Similarly in FIG. 11, the destination of a copy of the corresponding setting contents is the central control unit 70 of the administrative center 5-2.

In FIG. 12, in the setting-file content display field 84AL, the setting contents (a second setting) registered in the building control unit 40B which is the new reference source (the second reference source) is displayed, and in the third row, "LEFT" is shown as an item "Entrance Name", and in the fourth row, "BACK" is shown as an item "Entrance Name".

If a ">>" button in the "To Right" field of the "Copy" instruction field 84AL of FIG. 12 is selected by a click or the like, the setting contents registered in the building control unit 40B connected to the administrative center 5-1 are copied, in units of each row, and pasted in the setting of the central control unit 70 of the administrative center 5-2.

FIG. 13 shows the state where the setting contents (the first setting) registered in the building control unit 40A of the dwelling building A connected to the administrative center 5-1, and the setting contents (the second setting) registered in the building control unit 40B of the dwelling building B connected to the administrative center 5-1 have been collected in the central control unit 70 of the administrative center 5-2 by the operations of FIG. 11 and FIG. 12.

Registration of the data by the data update instruction field 84Aup and saving of the corresponding data by the "Save" field is the same as described with reference to FIG. 6, so a description thereof will not be made.

As described above, by collecting the contents of a plurality of different setting files in one unregistered setting file, it is possible to more efficiently performs setting registration. By such setting registration, for example, it is possible to register the contents of the setting file a new dwelling building having apartments more than an existing dwelling building has, by copying the contents of the setting file registered in the building controller of the existing dwelling building, and it is possible to more efficiently perform registration of the setting of a new dwelling building.

However, the present invention is not limited to the above-described embodiment, and various modifications, improvements, etc. can be made as appropriate. Also, the shapes, forms, numbers, installation places, and so on of the individual components of the above-described embodiment are optional and are not limited as long as it is possible to implement the present invention.

DESCRIPTION OF REFERENCE NUMERALS AND SYMBOLS

10A, 11A, 12A, 10B, 11B, 12B: Building Entrance Device
20A, 20B: Administrative-Room parent device
30A, 31A, 32A, 33A, 34A, 35A, 30B, 31B, 32B, 33B, 34B, 35B: Dwelling parent device
40A, 40B: Building Control Unit
5-1, 5-2: Administrative Center
50: Central Building Entrance Device
60: Central Administrative-Room Parent Device
70: Central Control Unit
8: Setting apparatus
81A, 82A, 83A: Accessing Unit 84A: Display Unit
85A: Control Unit
L1, L2, L3, L4, L5, L6: Intercom Line

The invention claimed is:

1. An interphone system for an apartment complex composed of a plurality of dwelling buildings, and a central building capable of communicating with the dwelling buildings, wherein:
   each of the dwelling buildings includes:
   apartment parent devices which are installed in apartments, respectively;
   a plurality of terminal devices capable of communicating with the apartment parent devices; and
   a building controller which is connected to the apartment parent devices of the apartments and the plurality of terminal devices provided in the corresponding building,
   each of the apartment parent devices, the terminal devices, and the building controllers has a setting file containing control contents for control of the corresponding device,
   the interphone system further includes a setting apparatus capable of accessing each of the setting files of the apartment parent devices, the terminal devices, and the building controllers, and
   the setting apparatus includes:
   an accessing unit configured to access at least registered one of the setting files and at least unregistered one of the setting files;
   a display unit configured to display the control contents of the plurality of accessed setting files; and
   a control unit configured to be able to copy the control contents of the registered setting file displayed on the display unit into the unregistered setting file.

2. The interphone system according to claim 1, wherein:
   the central building has a central-building terminal device capable of communicating with the apartment parent devices of the dwelling buildings, and a central control unit configured to connect the central building and the dwelling buildings such that communication is possible,
   the central-building terminal device has a setting file containing control contents for control of the central-building terminal device, registered therein in advance,
   the accessing unit is configured to be able to access the setting file of the central-building terminal device, and
   the control unit is configured to be able to copy the control contents registered in the central-building terminal device in advance, into an unregistered setting file of the dwelling buildings.

3. The interphone system according to claim 1, wherein:
   the terminal devices of the dwelling buildings include building entrance devices,
   the building entrance devices have setting files containing control contents for control of the building entrance devices, registered therein in advance, and
   the accessing unit is configured to access the setting files of the terminal devices registered in advance.

4. The interphone system according to claim 1, wherein:
   the terminal devices of the dwelling buildings include administrative-room parent devices,
   the administrative-room parent devices have setting files containing control contents for control of the administrative-room parent devices, registered therein in advance, and
   the accessing unit is configured to access the setting files of the terminal devices registered in advance.

5. The interphone system according to claim 2, wherein:
   the central-building terminal device further has an unregistered setting file, and
   the control unit is configured to be able to copy the control contents registered in the terminal devices of the dwelling buildings into the unregistered setting file of the central-building terminal device.

6. A setting apparatus comprising:
   the accessing unit, the display unit, and the control unit according claim 1.

* * * * *